United States Patent [19]

Warhol

[11] 4,166,730

[45] Sep. 4, 1979

[54] SCRUBBER

[76] Inventor: John G. Warhol, 14041 Vernon Ave., Oak Park, Mich. 48237

[21] Appl. No.: 909,489

[22] Filed: May 25, 1978

[51] Int. Cl.$^2$ ............................................. B01D 47/00
[52] U.S. Cl. ...................................... 55/223; 55/233; 55/257 R; 261/98
[58] Field of Search ............... 55/133, 240, 241, 257, 55/259, 223, 225; 261/98, 112; 159/43, 8, 16 R, 13; 203/49

[56] References Cited

U.S. PATENT DOCUMENTS

| | | | |
|---|---|---|---|
| 2,003,649 | 6/1935 | Hasselbach | 159/8 |
| 3,122,594 | 2/1964 | Kielback | 55/233 |
| 3,210,914 | 10/1965 | Eckert | 55/233 |
| 3,525,197 | 8/1970 | Sheehan | 55/233 |
| 3,768,234 | 10/1973 | Hardison | 55/233 K |
| 3,810,348 | 5/1974 | Byers et al. | 55/233 |

*Primary Examiner*—Norman Yudkoff
*Attorney, Agent, or Firm*—Vogel, Dithmar, Stotland, Stratman & Levy

[57] ABSTRACT

This invention relates to a scrubber for removing or neutralizing pollutants from air or other gaseous media by means of water and/or suitable chemicals. The construction embodying the invention is simple, compact and susceptible to prefabrication and provides means to confine or restrict the flow of polluted material through random paths. The polluted air is forced into a jet or jets of scrubbing fluid, such as water or a chemical, then along a plurality of separated paths within which are located movable flexible scrubber belts and small spheres of plastic or other materials, preferably hollow and light. There is also provided for some cyclone action prior to discharge from the scrubber. The nature of the scrubber is such as to permit the use of metal or plastics and can be made in different sizes and shapes. An additional group of hollow plastic spheres may be provided for condensing scrubout liquid or vapors from scrubbed gaseous material after the scrubbing operation.

4 Claims, 2 Drawing Figures

SCRUBBER

BACKGROUND OF THE INVENTION

Many pollutants discharged into atmosphere or water have violated environmental pollution laws and regulations. As a rule, scrubbers for removing or eliminating pollutants require considerable space, frequently extend upwardly for a substantial height and are generally expensive to manufacture due to the highly specialized mechanical features frequently necessary in scrubber systems.

SUMMARY OF THE INVENTION

A scrubber embodying the present invention is characterized by mechanical simplicity, susceptible to being constructed of sheet material and being readily adapted to be constructed in part or in whole of metal or any desired plastic suitable for the application of scrubbing chemicals or fluids to the polluted air or liquid as the case may be, while providing a large effective surface area for contact between the scrubbing agent and the air to be scrubbed.

Furthermore, it is an important feature of this invention that the scrubber maximizes contact between the scrubbing agent and the material to be scrubbed, while at the same time minimizing obstruction of the flow of materials through the scrubber, and accordingly reducing the power requirements for operation of the scrubber and increasing the volume of material which can be handled with a given power expenditure.

These features are attained by providing a pile or bed of light hollow plastic balls through which the scrubbant and the material to be scrubbed is passed.

DESCRIPTION OF THE PREFERRED EMBODIMENT

Figure 1:
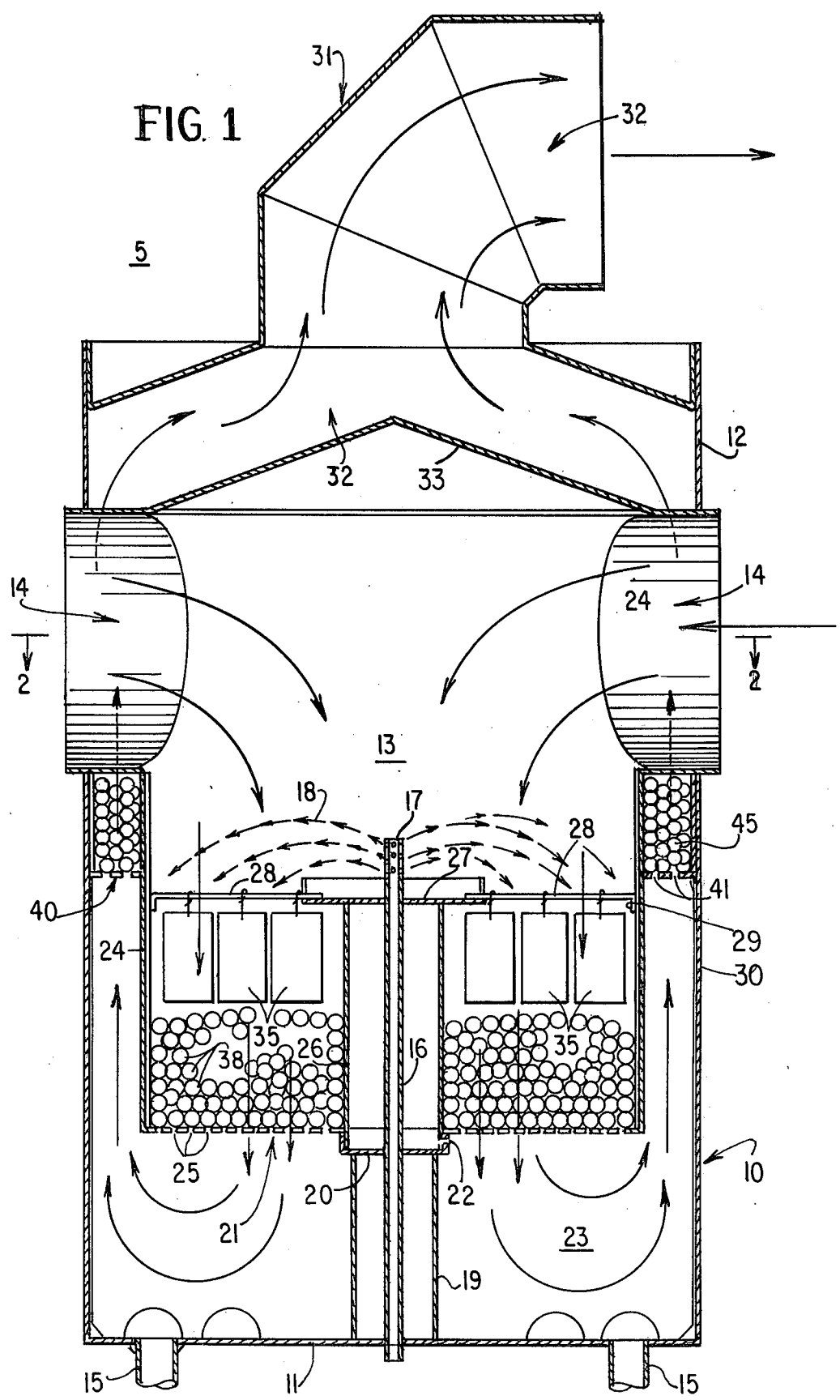
FIG. 1 shows a vertical sectional view of an exemplary embodiment of the invention, it being understood that variations therefrom within the scope of the claims may be made without departing from the invention.
Figure 2:
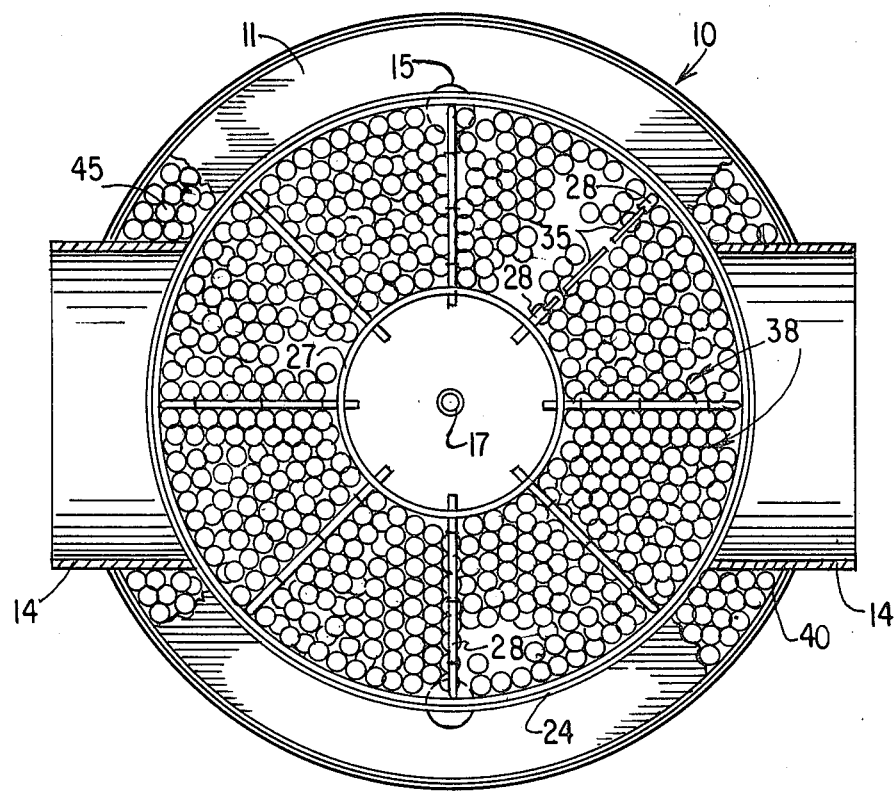
FIG. 2 is a horizontal section on lines 2—2 of FIG. 1.

A scrubber embodying the present invention is shown in the drawings and may be made of sheet material, plastic, fiberglass or metal, having suitable resistance to the chemicals being handled and having suitable mechanical characteristics of strength, commercial availability, and ready susceptibility to fabrication and welding. For example, in the case of plastics, welding by ultrasonics or cementing may be desirable. As far as metal is concerned, conventional sheet metal fabrication may be used.

The scrubber 5 has a housing 10 extending vertically, bounded at the bottom by plate 11 and provided at the upper end thereof with a cylindrical top portion 12. Housing 10 is conveniently cylindrical in shape and, as an example, may have a length of about ten feet, but it will be appreciated that the size will vary depending upon the application. One or more intake pipes 14 extends through the housing 10 into a chamber 13 adjacent to the upper end thereof for providing material to be scrubbed. As a rule, the material to be scrubbed may be in the form of a vapor or gas, such as air, for example, contaminated with pollutants to be eliminated in the scrubbing operation. The polluted material may also be in the form of a liquid, in which case the intake pipes 14 would be comparatively small in diameter. In any case, the intake pipes 14 may either be circular in cross section or rectangular and will be appropriate for handling the polluted material. As illustrated, intake pipes 14 are provided at diametrically opposed regions of cylindrical housing 10, but it is to be understood that the number and size of such pipes 14 will be determined by the volume of polluted material to be forced into the housing 10 for scrubbing action. The polluted material to be scrubbed may be forced into housing 10 either under pressure by suitable pump means or pulled into such scrubber by suitable suction conditions within the entire system.

It is understood that the transverse dimensions of housing 10 will be adequate to handle the required volume of material to be scrubbed and, as an example, housing 10 may have a diameter of about four feet. The diameter of housing 10 need not necessarily be limited by the height of housing 10. Drains 15 may be provided in the bottom plate 11. Extending upwardly through bottom plate 11 of the housing 10 centrally thereof is a pipe 16 for supplying scrubbant which functions to actually perform the scrubbing functions upon the polluted material to be handled. Such scrubbant is typically a liquid chemical or water, depending upon scrubber requirements. In the case of a liquid, pipe 16 would be a comparatively small diameter pipe terminating at the upper end thereof in a discharge portion 17 having numerous holes through the wall of the pipe and permitting discharge of the scrubbing material or scrubbant 18 into the upper interior of the housing 10 into which intake pipes 14 normally discharge. Discharge portion 17, which can be a hooded flare nozzle or other means of flaring the pumped solution, is well up in housing 10 and the entire pipe 16 is preferably axially disposed of housing 10. If pipe 16 carries a chemical or water for accomplishing scrubbing, then such chemical or water may be supplied under pressure so that pipe 16 need not be too large. Pipe 16 itself will be of suitable material, such as metal, fiberglass or plastic, depending upon design requirements. Resting upon the bottom plate 11 of the housing 10 is a support pipe 19 which encircles the bottom part of pipe 16 and supports thereon a central sink portion 20 of an annular basket 21 having perforations 25 therein. Drain holes 22 are provided in the side walls of the sink portion 20 to permit liquid to discharge into annular chamber 23 disposed below the basket 21 and extending around the outside of support pipe 19.

Basket 21 has a vertically extending outer cylindrical side wall 24 extending upwardly from the outer edge thereof, and a vertically extending inner cylindrical side wall 26 extending upwardly from the juncture between the inner edge thereof and the sink portion 20. The inner side wall 26 is disposed in coaxial surrounding relationship with the upper portion of the pipe 16, and supports at its upper end an annular top plate 27 having angularly spaced rods 28 extending substantially radially outwardly to the interior surface of the basket outer side wall 24. The outer ends of the rods 28 are fixedly secured as at 29 to the inside surface of basket side wall 24. Basket side wall 24 extends for a substantial distance above rods 28 and defines thereabove the chamber 13. Side wall 24 is radially spaced a predetermined distance from the housing 10 for cooperation with the adjacent portion thereof to provide an annular passage 30. The upper end of the cylindrical side wall 24 is closed by a generally conical cover plate 33, which also closes the upper end of the chamber 13 and cooperates with a hood structure 31 carried by top portion 12 of the housing 10 to define an exhaust conduit 32 which communicates with the passage 30.

Referring back to the basket 21, each of the rods 28 has one or more thin light flat belts 35 hanging loosely therefrom by means of metal or plastic hooks or ropes. Belts 35 are of metal, nylon or other webbing as desired, and quite light and thin to provide movable surfaces against which drops or currents of fluid may impinge, or down which such drops may flow. The belts 35 are of a suitable material such as metal, nylon or a plastic, such as that sold under the trademark "Mylar," to be resistant to the fluids present. The dimensions of the belts 35 may vary within wide limits. It is preferred, however, to leave a substantial volume of the basket 21 below the belts 35 within which are disposed light hollow plastic balls 38. Such plastic balls 38 are available in the market and generally have a diameter on the order of from about ½ inch to about several inches, as desired. Such plastic balls 38 are preferably loosely piled in the basket 21 and are light enough so that some movement of the plastic balls 38 in response to fluid currents within the housing 10 and through the basket 21 is possible. The perforations 25 in the basket 21 are substantially smaller than the plastic balls 38 so as to support the balls 38 while permitting flow of fluid downwardly through the basket 21 into chamber 23.

There may also be mounted in the passage 30, preferably just below the intake pipes 14, an annular basket 40, which is similar in construction to the basket 21 and is provided in the bottom thereof with a plurality of perforations or apertures 41. The basket 40 extends between and is fixedly secured to the housing 10 and the outer side wall 24 of the basket 21 and contains a plurality of plastic balls 45, which may be identical to the balls 38.

In operation, the air or other fluid material which is to be scrubbed is introduced into the chamber 13 through the intake pipes 14 and is drawn downwardly in the direction of the arrows in FIG. 1 into the basket 21, where it contacts the scrubbant 18 which is being sprayed over the basket 21 from the discharge portion 17 of the pipe 16. In the case of a liquid scrubbant, the scrubbant 18 wets the surfaces of the belts 35 and the plastic balls 38 as it passes downwardly thereover. These surfaces are also contacted by the material to be scrubbed as it passes downwardly through the basket 21. Thus, the surfaces of the belts 35 and the spherical surfaces of the balls 38 provide a large contact area at which the principal scrubbing action takes place when the scrubbant contacts the material to be scrubbed. The belts 35 are loosely hung and the balls 38 are loosely piled in the basket 21 so as to be subject to movement by the currents of the fluids passage therethrough. It will be appreciated that the spherical shape of the balls 38 permits ready movement thereof with respect to each other so as to prevent minimum obstruction to the passage of the fluids therethrough.

After passing through the balls 38, the scrubbant 18 and material being scrubbed pass downwardly through the apertures or perforations 25 in the bottom of the basket 21 and into the chamber 23. Liquid scrubbant 18 collects on the bottom plate 11 and is discharged through the drains 15 for further processing and recirculation into the pipe 16. The material which has been scrubbed is drawn upwardly through the annular passage 30, and flows around the outsides of the intake pipes 14 and into the exhaust conduit 32. As it passes upwardly through the passage 30, the scrubbed material passes through the basket 40 and the balls 45 therein which are dry and serve to condense from the scrubbed fluid any remaining scrubbant liquid or vapor. This condensed scrubbant drains through the perforations 41 in the basket 40 and into the chamber 23 for discharge through the drains 15. Thus, it will be appreciated that the balls 45 serve to minimize the loss of scrubbant.

The basket 21 and its contents permit a thorough intermixing of the scrubbant and polluted material from the intake pipes 14 by providing maximum contact area for maximum intermingling and intermixing of the two to achieve complete scrubbing action, while presenting minimum resistance to the flow of polluted material and scrubbant. By selecting the right material for belts 35 and plastic balls 38, with respect to the nature of the gases and liquids involved and their respective surface tensions, considerable flexibility in the efficiency and operation of the scrubber 5 may be attained.

In the course of time, if the surfaces of the belts 35 and/or the plastic balls 38 and 45 become pitted and roughened to the point where replacement may be desired, or for other reasons such as viscosity of materials involved makes it desirable to change the material of the belts and/or balls, then such changes may be accomplished with little difficulty and little expense. Indeed the basket 21 and balls 38 may be provided as a package, removably mountable in the housing 10, as may the basket 40 and balls 45. By controlling the number and size of the belts and balls, the capacity of the scrubber system may be adjusted for maximum efficiency.

In addition to great simplicity of construction and operation, another important advantage offered by the scrubber 5 of the present invention is that it can be readily cleaned or flushed out simply by using a hose and directing a stream of water down through the baskets 21 and 40, with the water then being flushed out the drains 15.

In a constructional model of the scrubber 5, the housing 10 is approximately ten feet in height and four feet in diameter and may be mounted on suitable supports, with approximately 6,700 of the balls 38 being contained in the basket 21, the capacity of the scrubber 5 being approximately 10,000 cubic feet per minute. It will be understood that the size and capacity of the scrubber 5 may be varied depending upon the particular application.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A scrubber comprising a cylindrical housing, a supply conduit extending axially of said housing for conveying scrubbant from an associated source upwardly along a vertical supply path to the upper end of said housing, means within said housing cooperating with said supply conduit for separating the interior of said housing into an upper chamber and an annular lower chamber surrounding said supply conduit and an annular scrubbing region surrounding said supply conduit between said upper and lower chambers, means for supplying material to be scrubbed to said upper chamber, the scrubbant and the material to be scrubbed flowing downwardly along an annular scrubbing path from said upper chamber through said scrubbing region to said lower chamber, contact means including light hollow plastic spherical balls disposed in said scrubbing region and providing spherical contact surfaces for maximizing the contact between the scrubbant and the material to be scrubbed while minimizing resistance to the flow of the scrubbant and the material to be scrubbed therethrough, and means defining an annular exhaust path coaxially surrounding the scrubbing path and providing communication between said lower chamber and an outlet port at the upper end of said housing for exhausting scrubbed material from said lower chamber.

2. The scrubber of claim 1, and further including loosely hung thin belts provided in said scrubbing region to promote scrubber action.

3. The scrubber of claim 1, and further including means containing a second group of hollow plastic spherical balls disposed in said annular exhaust path and through which the scrubbed material passes after it leaves the second chamber, said second group of balls serving to condense residual scrubbant from the scrubbed material.

4. The scrubber of claim 1, wherein said contact means includes a basket removably mounted in said scrubbing region and holding the balls therein while permitting passage therethrough of the scrubbant and the material to be scrubbed.

* * * * *